3,155,703
BICYCLIC PHOSPHITES AND PHOSPHATES
William D. Emmons, Huntingdon Valley, and William S. Wadsworth, Jr., Elkins Park, Pa., assignors to Rohm & Haas Company, Philadelphia, Pa., a corporation of Delaware
No Drawing. Filed Feb. 10, 1959, Ser. No. 792,262
2 Claims. (Cl. 260—461)

This invention relates to bicyclic phosphites and phosphates and methods for preparing them. More particularly, it relates to phosphites and phosphates having the structural formula

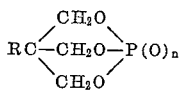

wherein R is an alkyl group having one to four carbon atoms, an hydroxymethyl group, an acyloxymethyl group wherein the acyl group has one to 18 carbon atoms, or an alkoxy methyl group in which the alkyl group has one to four carbon atoms, and $n$ is zero to one, inclusive.

The alkyl group in said compounds includes methyl, ethyl, n-propyl, isopropyl, n-butyl, isobutyl, and the like, the acyl group includes aliphatic carboxylic acid residues, such as formyl, acetyl, propionyl, butyryl, octanoyl, dodecanoyl, myristyl and stearyl, comparable unsaturated residues, such as acryloyl, methacryloyl, crotonyl and oleyl, as well as cyclic acid residues, such as benzoyl, cinnamoyl, hexahydrobenzoyl, butylbenzoyl, and the like.

The bicyclic phosphites may be prepared by transesterification of a trimethylol alkane with a trialkyl phosphite. Alternatively, they may be prepared by reacting a trimethylol alkane with a phosphorus trihalide, preferably phosphorus tribromide or phosphorus trichloride.

The bicyclic phosphates result from oxidation of the corresponding bicyclic phosphites, or alternatively from the reaction of a trimethylol alkane with a phosphorus oxyhalide, preferably the chloride or bromide.

The following examples are specific illustrations of methods for preparing these new bicyclic phosphites and/or phosphates.

EXAMPLE 1

Preparation of Ethyl Bicyclic Phosphite

Trimethylol propane, 268 g. (2.0 moles), and distilled triethyl phosphite, 332 g. (2.0 moles), are charged to a 1 liter, three-necked, round-bottom reaction flask containing a thermometer, stirrer and still head. Approximately 5 drops of triethylamine catalyst is added and the mixture heated with stirring to 100° C. at which point alcohol begins to distill off. The temperature of the mixture is raised to 130° C. over a period of 8 hours during which time 97% of the theoretical quantity of alcohol is collected.

At the end of the heating period the resulting clear solution is distilled giving a 90% yield of product boiling at 75–80° C. (at 0.5 mm.). The product solidifies on cooling, M.P. 55–6° C.

In a similar manner, by replacing trimethylol propane in the above example with an equivalent weight of 1,1,1-trimethylol-2-ethoxyethane, there results ethoxymethyl bicyclic phosphite.

EXAMPLE 2

Preparation of Hydroxymethyl Bicyclic Phosphite

Pentaerythritol, 340.3 g. (2.5 moles), and distilled triethyl phosphite, 415.3 g. (2.5 moles), are charged to a 2 liter, three-necked, round-bottom reaction flask containing a thermometer, stirrer and still head. Approximately 5 drops of triethylamine catalyst is added and the mixture heated with stirring to 120° C. After collecting the first few drops of alcohol, the temperature of the mixture is reduced to 100° C. and stirred at this lower temperature for approximately 24 hours. During the heating period 85% of the theoretical amount of alcohol is collected. At the end of the 24-hour period the temperature is gradually raised to 130° C. over a two-hour period during which time the solution becomes homogeneous and clear. Approximately 92% of the theoretical amount of alcohol is collected during the total heating period.

The clear solution is flash distilled at 200° C. under a vacuum of 0.25 to 0.5 mm. giving 89% of crude semi-crystalline product. An 80% yield of pure product is obtained after redistillation of crude material at 120° C. (0.5 mm.). The phosphite crystallizes on cooling, M.P. 61° C.

EXAMPLE 3

Preparation of Myristyloxymethyl Bicyclic Phosphite

Trimethylol ethyl myristate, 346.5 g. (1.0 mole), and distilled triethyl phosphite, 166 g. (1.0 mole), are charged to a 1 liter, three-necked, round-bottom reaction flask containing a thermometer, stirrer and still head. Approximately 5 drops of triethylamine catalyst is added and the mixture heated with stirring to 100° C. at which point alcohol begins to distill off. The temperature of the mixture is raised to 130° C. over a period of eight hours during which time 80% of the theoretical quantity of alcohol is collected.

At the end of the heating period the resulting clear solution is distilled giving a 61% yield of product boiling at 190–5° C. (at 0.2 mm.). The product solidifies on cooling, M.P. 30–2° C.

Acyloxymethyl bicyclic phosphites can also be prepared conveniently by treating hydroxymethyl bicyclic phosphite with an acyl halide in the presence of a tertiary amine. For instance, methacryloxy methyl bicyclic phosphite results from proceeding as follows:

Hydroxymethyl bicyclic phosphite, 65.6 g. (0.4 mole), is dissolved in 400 cc. of distilled methylene chloride. A pinch of hydroquinone is added and the solution cooled to below −10° C. by means of a Dry Ice-acetone bath. Methacrylyl chloride, 42.0 g. (0.4 mole) is added with stirring followed by the dropwise addition of triethyl amine, 40.4 g. (0.4 mole), to the cold solution. The mixture is allowed to come to room temperature, suction filtered, and the precipitate washed well with distilled methylene chloride.

The combined filtrates are stripped at reduced pressure leaving a crystalline residue which when recrystallized from isooctane affords a 79.0% yield of white crystalline product, M.P. 108° C.

EXAMPLE 4

Preparation of Ethyl Bicyclic Phosphite by Alternative Method

Phosphorus trichloride, 68.6 g. (0.5 mole), is charged to a 300 ml., three-necked, round-bottom reaction flask fitted with a stirrer, thermometer, condenser and gas inlet tube. The flask is cooled to 0° C. and trimethylol propane, 67.1 g. (0.5 mole) is added all at once with stirring. Nitrogen gas is passed into the flask in order to sweep out hydrogen chloride as it is formed. The mouth of the gas inlet tube is held above the surface of the liquid. The mixture is stirred and the apparatus swept with nitrogen for a total of eight hours during which time the temperature was gradually raised to 70° C.

At the end of the reaction period the clear homogeneous reaction mixture is distilled giving a 73% yield of product, 65–70° C. (at 0.25 mm.), M.P. 55–6° C.

EXAMPLE 5

*Preparation of Ethyl Bicyclic Phosphate*

A nearly saturated solution of ethyl bicyclic phosphite in isopropanol is prepared. The alcoholic solution is chilled and a 35% solution of alcoholic hydrogen peroxide (made from 90% $H_2O_2$ on isopropanol) is added dropwise with stirring until exotherm ceases. The oxidation is extremely exothermic requiring constant cooling during the addition of the peroxide.

On cooling and standing a nearly quantitative yield of ethyl bicyclic phosphate precipitates, M.P. 202° C.

By following the method last above referred to, with the substitution for ethyl bicyclic phosphite of an equivalent amount of another bicyclic phosphite, for instance the hydroxymethyl, the myristyloxymethyl, or the methacryloxymethyl bicyclic phosphite, the corresponding phosphate is formed.

EXAMPLE 6

*Preparation of Ethyl Bicyclic Phosphate by Alternative Method*

Trimethylol propane, 134.2 g. (1.0 mole), is charged to a 500 ml., three-necked, round-bottom flask fitted with a stirrer, thermometer, condenser, dropping funnel and gas inlet tube. Phosphorus oxychloride, 153.4 g. (1.0 mole) is added dropwise while the temperature is kept below 30° C. Stirring is initiated as soon as the reaction mixture becomes fluid. After the addition of the phosphorus oxychloride, the mixture is stirred at room temperature and nitrogen gas is passed over the solution in order to sweep out hydrogen chloride as it is formed. At the end of 16 hours the temperature is gradually raised to 70° C. with the stirring and passage of nitrogen continuing.

The tan semicrystalline mixture which results is taken up in hot water and the solution heated over a steam bath for one hour. The solution is cooled and filtered, giving a 51% yield of light tan crystalline precipitate. The product is recrystallized from hot water, M.P. 202° C.

The bicyclic phosphites and phosphates of this invention have been found to be useful for a variety of purposes. For example, when 0.20 weight percent of ethyl bicyclic phosphite is added to a lubricating oil base stock and the resulting product compared with the stock per se in a standard wear tester, it is found that such product is markedly improved over the stock per se in wear resisting properties. Other bicyclic phosphites and phosphates impart wear-resistant and other desirable properties to lubricating oil stocks.

The bicyclic phosphites and phosphates which contain an acryloxy or methacryloxy group copolymerize with methyl methacrylate and monomers of similar character containing a $CH_2\!=\!C\!<$ group to form hard, flame-resistant copolymers.

Certain of the phosphites and phosphates, for instance those containing long chains of which the laurate of hydroxymethyl bicyclic phosphate is typical, have been found to serve advantageously as plasticizers or vinyl chloride and the like. The resulting products have excellent heat stability, are pliable, and the plasticizer is retained thereby to a far greater extent than many plasticizers now in use.

We claim:

1. A compound of the formula

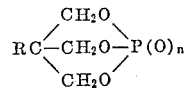

wherein R is an alkoxymethyl group of two to five carbon atoms, and $n$ is zero to one, inclusive.

2. A compound of the formula

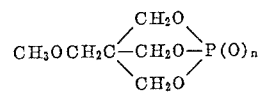

where $n$ is zero to one, inclusive.

References Cited in the file of this patent

UNITED STATES PATENTS

| | | |
|---|---|---|
| 2,643,261 | Matuszak et al. | June 23, 1953 |
| 2,847,443 | Hechenbleikner et al. | Aug. 12, 1958 |

OTHER REFERENCES

Carre: Bull. Soc. Chim. de France 27, 3, 261–269 (1902).